(12) United States Patent
Yadav et al.

(10) Patent No.: US 12,541,432 B2
(45) Date of Patent: Feb. 3, 2026

(54) LEVERAGING FILE-SYSTEM METADATA FOR DIRECT TO CLOUD OBJECT STORAGE OPTIMIZATION

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 17/952,480

(22) Filed: Sep. 26, 2022

(65) Prior Publication Data

US 2024/0103973 A1 Mar. 28, 2024

(51) Int. Cl.
*G06F 11/14* (2006.01)
*G06F 16/16* (2019.01)

(52) U.S. Cl.
CPC ........ *G06F 11/1451* (2013.01); *G06F 16/164* (2019.01); *G06F 2201/84* (2013.01)

(58) Field of Classification Search
CPC . G06F 11/1451; G06F 16/164; G06F 2201/84
See application file for complete search history.

(56) References Cited

U.S. PATENT DOCUMENTS

| | | | | |
|---|---|---|---|---|
| 2010/0333116 | A1* | 12/2010 | Prahlad | G06F 3/067 713/153 |
| 2015/0227602 | A1* | 8/2015 | Ramu | G06F 11/1456 707/634 |
| 2020/0142783 | A1* | 5/2020 | Dornemann | G06F 11/1469 |
| 2021/0389883 | A1* | 12/2021 | Derryberry | G06F 11/2094 |

* cited by examiner

*Primary Examiner* — Apu M Mofiz
*Assistant Examiner* — Oscar Wehovz
(74) *Attorney, Agent, or Firm* — Chamberlain, Hrdlicka, White, Williams & Aughtry; Aly Z. Dossa

(57) ABSTRACT

A method and system for leveraging file-system metadata for direct to cloud object storage optimization. Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery. Cloud object storage, however, tends to be costly—mainly stemming from factors, such as the frequency of read and write operations (also referred to as runtime costs) applied to, as well as the allocation of disk space (also referred to as storage costs) consumed by, any number of objects configured to store file backup copies. In addressing at least the aforementioned, embodiments disclosed herein optimize cloud object storage utilization through the intelligent grouping and object storing of data based on file attribute similarities.

18 Claims, 12 Drawing Sheets

LEVERAGING FILE-SYSTEM METADATA FOR DIRECT TO CLOUD OBJECT STORAGE OPTIMIZATION

BACKGROUND

Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery.

SUMMARY

In general, in one aspect, the invention relates to a method for optimizing object-based backups. The method includes obtaining, from a host file-system, file-system metadata descriptive of files; associating, based on the file-system metadata, at least a subset of the files with a shared object group; and performing an object-based backup of the at least subset of the files using at least one shared object.

In general, in one aspect, the invention relates to a non-transitory computer readable medium (CRM). The non-transitory CRM includes computer readable program code, which when executed by a computer processor, enables the computer processor to perform a method for optimizing object-based backups. The method includes obtaining, from a host file-system, file-system metadata descriptive of files; associating, based on the file-system metadata, at least a subset of the files with a shared object group; and performing an object-based backup of the at least subset of the files using at least one shared object.

In general, in one aspect, the invention relates to a system. The system includes a host device. The host device includes a computer processor; a host operating system executing on the computer processor and configured to implement a host file-system for managing files; and a host protection agent also executing on the computer processor and having access to the host file-system, wherein the host protection agent is configured to perform a method for optimizing object-based backups. The method includes obtaining, from the host file-system, file-system metadata descriptive of the files; associating, based on the file-system metadata, at least a subset of the files with a shared object group; and performing an object-based backup of the at least subset of the files using at least one shared object.

Other aspects of the invention will be apparent from the following description and the appended claims.

DETAILED DESCRIPTION

Figure 1:
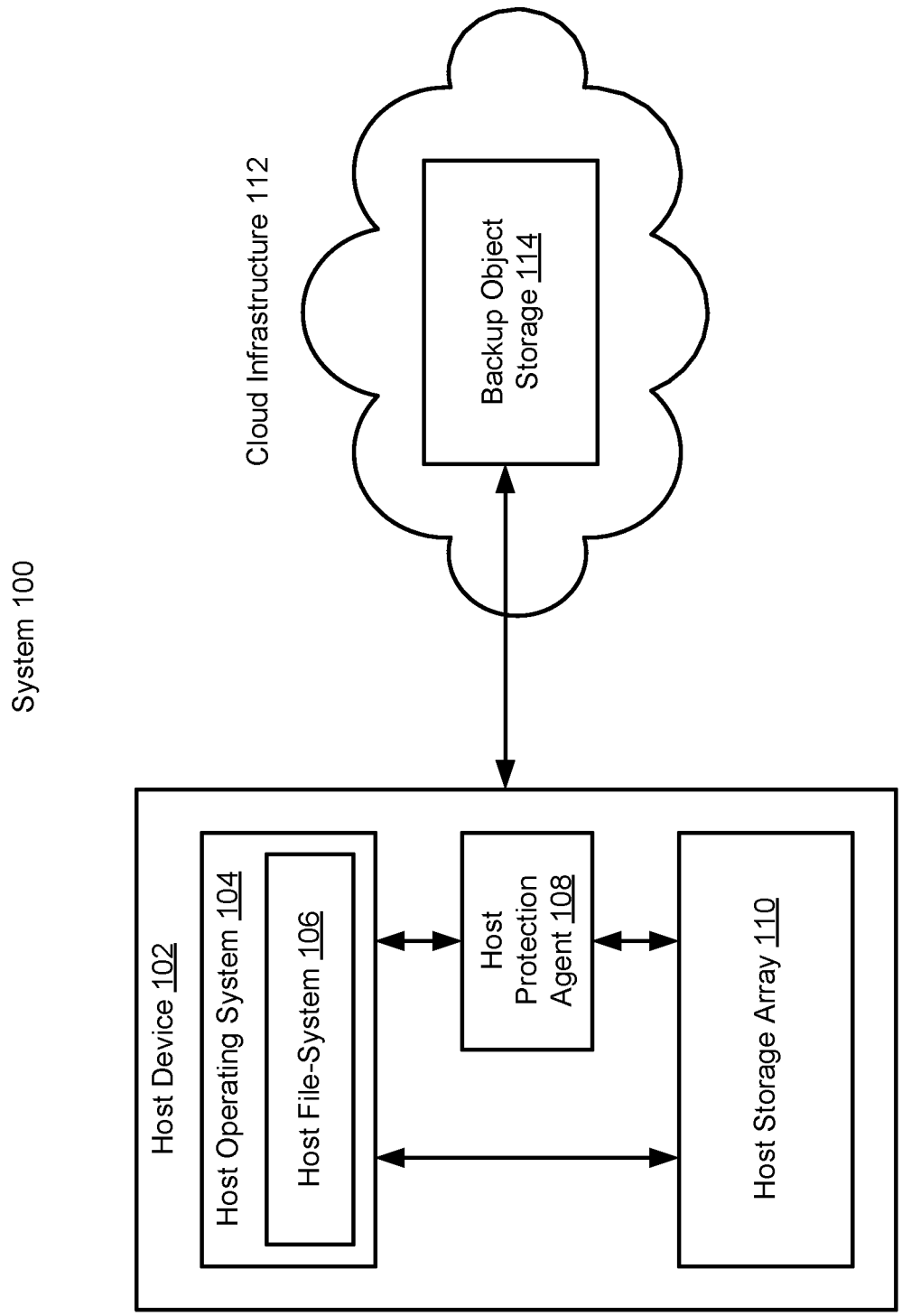
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to leveraging file-system metadata for direct to cloud object storage optimization. Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery. Cloud object storage, however, tends to be costly—mainly stemming from factors, such as the frequency of read and write operations (also referred to as runtime costs) applied to, as well as the allocation of disk space (also referred to as storage costs) consumed by, any number of objects configured to store file backup copies. In addressing at least the aforementioned, embodiments disclosed herein optimize cloud object storage utilization through the intelligent grouping and object storing of data based on file attribute similarities.

FIG. 1 shows a system in accordance with one or more embodiments of the invention. The system (100) may include a host device (102) and cloud infrastructure (112). Each of these system (100) components is described below.

In one or many embodiment(s) of the invention, the host device (102) may represent any physical appliance or computing system configured to receive, generate, process, store, and/or transmit data, as well as to provide an environment in which one or many computer program(s) may execute thereon. The computer program(s) may, for example, implement large-scale and complex data processing; or implement one or more services offered locally or over a network (not shown). Further, in providing an execution environment for any computer program(s) installed thereon, the host device (102) may include and allocate various resources (e.g., computer processors, memory, storage, virtualization, network bandwidth, etc.), as needed, to the computer program(s) and/or the tasks (or processes) instantiated thereby. Examples of the host device (102) may include, but may not be limited to, a desktop computer, a laptop computer, a network server, a network mainframe, a smartphone, a tablet computer, or any other computing system similar to the exemplary computing system illustrated and described with respect to FIG. 3, below.

In one or many embodiment(s) of the invention, the host device (102) may include a host operating system (104), a host protection agent (108), and a host storage array (110). Each of these host device (102) subcomponents is described below.

In one or many embodiment(s) of the invention, the host operating system (104) may refer to a computer program that may execute on the underlying hardware of the host device (102), which may be responsible for overseeing host device (102) operations. To that end, and at least in part, the host operating system (104) may include functionality to: support fundamental host device (102) functions; schedule tasks; mediate interactivity between logical (e.g., software) and physical (e.g., hardware) host device (102) components; allocate host device (102) resources; and execute or invoke other computer program(s) executing on the host device (102). Further, one of ordinary skill will appreciate that the host operating system (104) may perform other functionalities without departing from the scope of the invention.

For example, in one or many embodiment(s) of the invention, the host operating system (104) may facilitate the access and/or manipulation of any local data (i.e., logically represented through any number of files) by one or many other computer program(s) (e.g., host protection agent (108)) executing on the host device (102). In facilitating the aforementioned access and/or manipulation, the host operating system (104) may implement a host file-system (106).

In one or many embodiment(s) of the invention, the host file-system (106) may represent a physical file-system (also referred to as a file-system implementation), which may refer to a collection of subroutines concerned with the physical operation of one or many physical storage device(s). The host file-system (106), in this respect, may be concerned with the physical operation of the host storage array (110) (described below). Further, the host file-system (106) may employ host storage array (110) device drivers (or firmware) to process request file operations (e.g., read and/or write operations) from the aforementioned other computer program(s) executing on the host device (102). Device drivers enable the host file-system (106), and thus the host operating system (104), to manipulate physical storage (e.g., host storage array (110)) as appropriate.

In one or many embodiment(s) of the invention, the host file-system (106) may further include functionality to manage file-system metadata descriptive of any local data. Examples of file-system metadata, pertaining to any given file of local data, may include, but may not be limited to: a filename titling the given file; a file size indicating an amount of storage space (e.g., measured in bytes) consumed by the given file; a file path specifying a location, within the host file-system (106), of the given file; a file creation timestamp reflecting an encoded date and/or time at which the given file had been created (or first introduced) on the host device (102); a set of file access permissions indicating the user(s) permitted to interact with the given file; a set of file read/write attributes specifying file operation permissions for interacting with the given file; and a file type reflecting a format through which the given file may be encoded for storage. File-system metadata is/are not limited to the aforementioned specific examples.

In one or many embodiment(s) of the invention, the above-mentioned local data may refer to any data that may have been generated, received, manipulated, and/or otherwise maintained on/by the host device (102). Examples of local data may include, but may not be limited to, application data associated with the computer program(s) (excluding the host operating system (104)) executing on the host device (102), user data associated with one or many user(s) (not shown) operating the host device (102), and system data associated with the host operating system (104). Further, local data is not limited to the aforementioned specific examples.

In one or many embodiment(s) of the invention, the above-mentioned local data, or at least a portion thereof, may include unstructured data. Unstructured data, in turn, may refer to any data lacking organization through clearly-defined data frameworks or models (e.g., relational databases). Examples of said unstructured data may include, but may not be limited to, video, audio, images, email, text documents, sensor data, application logs, social media data, location or geo-positioning data, and transactions. Further, unstructured data is not limited to the aforementioned specific examples.

In one or many embodiment(s) of the invention, the host protection agent (108) may refer to a computer program that may execute on the underlying hardware of the host device (102), which may be responsible for facilitating backup and recovery operations entailing any granularity of local data. To that end, and at least in part, the host protection agent (108) may include functionality to: protect any local data against loss (i.e., through backup operations); and reconstruct any local data following said loss (i.e., through recovery operations). Further, one of ordinary skill will appreciate that the host protection agent (108) may perform other functionalities without departing from the scope of the invention.

In one or many embodiment(s) of the invention, the host storage array (110) may refer to a collection of one or more physical storage devices (not shown) on which various forms of digital information—e.g., local data—may be maintained. Each physical storage device may encompass non-transitory computer readable storage media on which said digital information may be stored in whole or in part, and temporarily or permanently. Further, the host storage array (110) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, the cloud infrastructure (112) (also referred to herein as a cloud computing environment) may represent a virtual pool of information technology (IT) resources and/or computing services. Further, said virtual pool of IT resources and/or computing services may be offered by third-party providers over the public Internet to multiple tenants or clients, where any given third-party provider may implement any given portion of the cloud infrastructure (112) using groups of datacenters that may be partitioned, through virtualization, and shared amongst the multiple tenants/clients. The cloud infrastructure (112), moreover, may include backup object storage (114), which is described below.

In one or many embodiment(s) of the invention, the backup object storage (114) may represent any data backup, archiving, and/or disaster recovery storage system. The backup object storage (114) may refer to physical storage (or logical storage occupying at least a portion of the physical storage) available throughout the cloud infrastructure (112), where any number of objects (described below) may be consolidated and indexed. Accordingly, the backup object storage (114) may, at least in part, be implemented using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, any object generally may refer to a uniquely identifiable unit of, as well as a fixed size container for storing, unstructured data (described above). Any said object disclosed herein may either be referred to as a dedicated object or a shared object. A dedicated object may refer to any object configured to store unstructured (local) data pertaining to any single file managed by the host file-system (106). Further, the stored single file may reflect a file size that at least meets a threshold file size (e.g., 4 mega-bytes (MB)). On the other hand, a shared object may alternatively refer to any object configured to store unstructured (local) data pertaining to multiple (i.e., two or more) files managed by the host file-system (106). Further, the stored multiple files may each reflect a file size that is less than the aforementioned threshold file size. The threshold file size, moreover, may match an optimal object size (e.g., 4 MB) configured for any object sought to be written into the backup object storage (114). The optimal object size may reference an object size for any object that may have been systematically optimized for conducting read and/or write operations, entailing the object, from and/or to the backup object storage (114) implemented in the cloud infrastructure (112).

In one or many embodiment(s) of the invention, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the invention. For example, in one or more embodiment(s) of the invention, the system (100) may further include one or more additional host devices (not shown)—each of which may operatively connect to the backup object storage (114) of the cloud infrastructure (112).

Figure 2A:
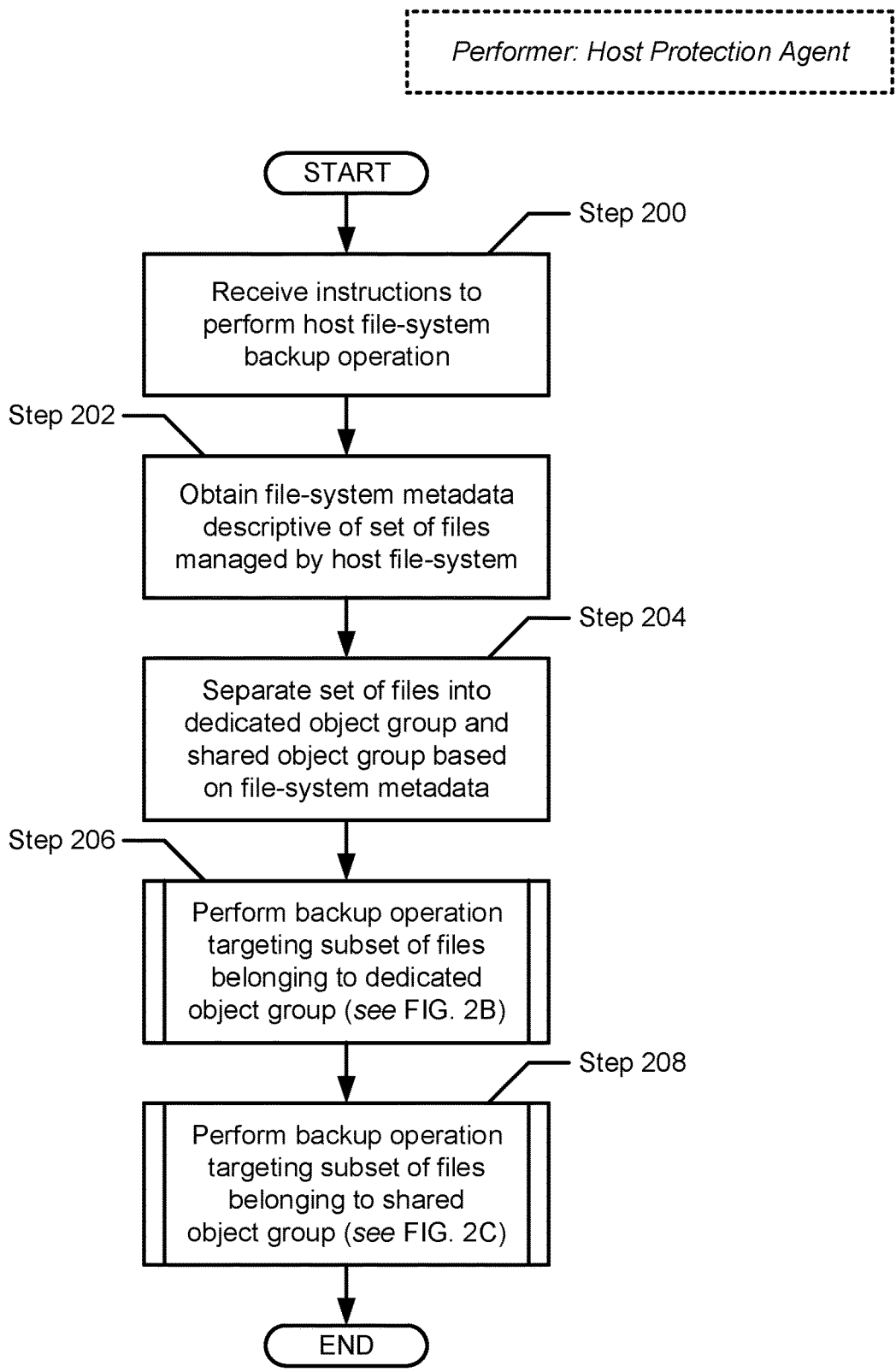
FIG. 2A shows a flowchart describing a method for leveraging file-system metadata for direct to cloud object storage optimization in accordance with one or more embodiments of the invention.

FIG. 2A shows a flowchart describing a method for leveraging file-system metadata for direct to cloud object storage optimization in accordance with one or more embodiments of the invention. The various steps outlined below may be performed by a host protection agent operating on a host device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, instructions, directed to performing a host file-system backup operation, are received. In one or many embodiment(s) of the invention, the host file-system backup operation may target files that may logically represent local data, in whole or in part, and that may be managed by a host file-system implemented on the host device.

In Step 202, file-system metadata is obtained. In one or many embodiment(s) of the invention, the file-system metadata may encompass information descriptive of the files targeted by the host file-system backup operation (for which instructions had been received in Step 200). Further, the file-system metadata may be managed by, and therefore obtained from, the host file-system. By way of an example, file-system metadata, of relevance hereinafter, for any file of the targeted files, includes a file size indicating an amount of storage space (e.g., measured in bytes) consumed by the file.

In Step 204, the targeted files are each separated into (or associated with) either a dedicated object group or a shared object group. In one or many embodiment(s) of the invention, association of each targeted file with either of the aforementioned object groups may depend on the file-system metadata (e.g., file size) (obtained in Step 202). Concerning said association, a targeted file may be associated with the dedicated object group should the file size thereof at least meet a threshold file size (e.g., 4 mega-bytes (MB)), whereas a targeted file may alternatively be associated with the shared object group should the file size thereof fall short of (i.e., is less than) the threshold file size.

In Step 206, an object-based backup operation is performed. In one or many embodiment(s) of the invention, this object-based backup operation may target any subset of the targeted files belonging to the dedicated object group (which had been associated therewith in Step 204). Said object-based backup operation is outlined and described in further detail with respect to FIG. 2B, below.

In Step 208, another object-based backup operation is performed. In one or many embodiment(s) of the invention, this object-based backup operation may target any subset of the targeted files belonging to the shared object group (which had been alternatively associated therewith in Step 204). Said object-based backup operation is outlined and described in further detail with respect to FIG. 2C, below.

Figure 2B:
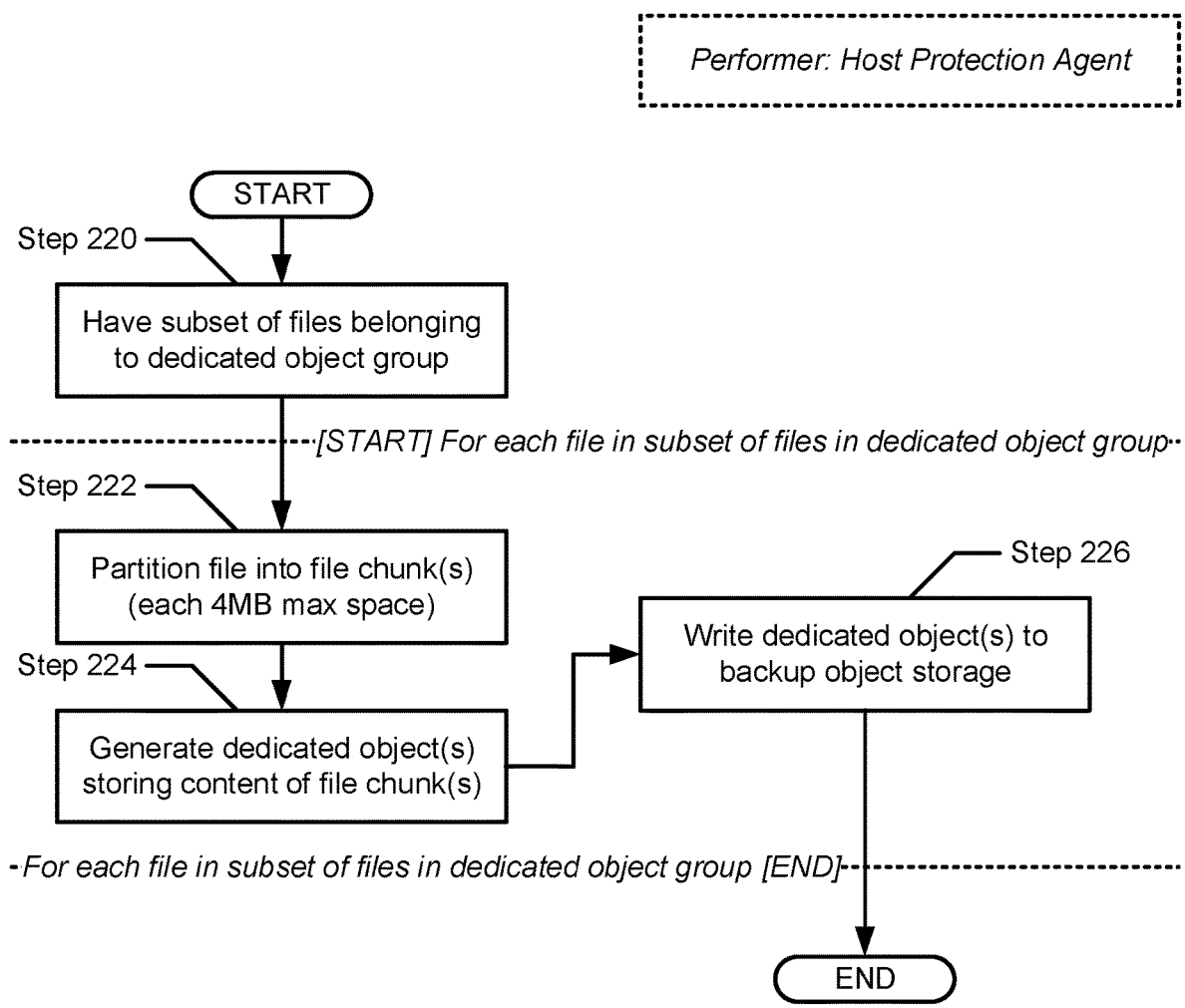
FIG. 2B shows a flowchart describing a method for performing a dedicated object group backup operation in accordance with one or more embodiments of the invention.

FIG. 2B shows a flowchart describing a method for performing a dedicated object group backup operation in accordance with one or more embodiments of the invention. The various steps outlined below may be performed by a host protection agent operating on a host device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2B, in Step 220, a subset of files is/are provided. In one or many embodiment(s) of the invention, any file(s) in the subset of files may be associated with a dedicated object group (see e.g., FIG. 2A).

Hereinafter, the remaining steps (i.e., Steps 222, 224, and 226) of the disclosed method are to be performed for each file in the subset of files (provided in Step 220). Each iteration of the remaining steps, respective to a given file, may be performed serially (e.g., a first iteration is executed, a second iteration is executed upon completion of the first iteration, a third iteration is executed upon completion of the second iteration, and so forth) or in parallel (e.g., multiple iterations are executed and completed concurrently).

In Step 222, the given file is partitioned into one or more file chunks. In one or many embodiment(s) of the invention, each file chunk may encompass a portion of the local data logically represented by the given file. Further, said portion of the local data, and thus the file chunk, may not exceed a predefined maximum chunk size (e.g., 4 MB).

In Step 224, one or more dedicated objects is/are generated. In one or many embodiment(s) of the invention, any dedicated object may refer to a uniquely identifiable unit of, as well as a fixed size container for storing, unstructured (local) data pertaining to the given file (i.e., a single file). Further, each dedicated object of the dedicated object(s) may, respectively, store a file chunk of the file chunk(s) (obtained in Step 222). Each dedicated object, moreover, may reflect an object size not to exceed an optimal object size (e.g., 4 MB).

In Step 226, the dedicated object(s) (generated in Step 224) is/are written to a backup object storage within a cloud infrastructure (see e.g., FIG. 1).

Figure 2C:
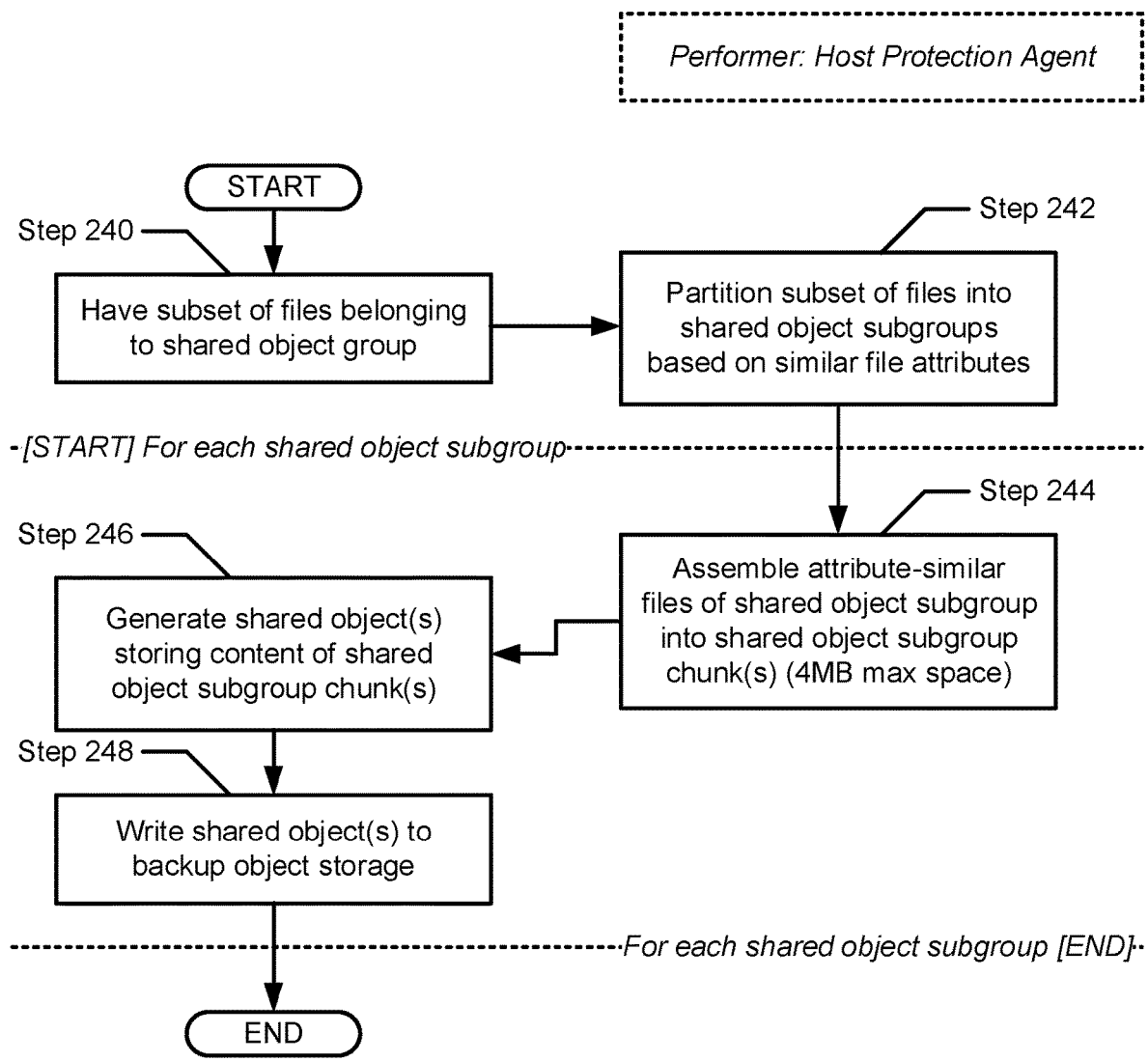
FIG. 2C shows a flowchart describing a method for performing a shared object group backup operation in accordance with one or more embodiments of the invention.

FIG. 2C shows a flowchart describing a method for performing a shared object group backup operation in accordance with one or more embodiments of the invention. The various steps outlined below may be performed by a host protection agent operating on a host device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2C, in Step 240, a subset of files is/are provided. In one or many embodiment(s) of the invention, any file(s) in the subset of files may be associated with a shared object group (see e.g., FIG. 2A).

In Step 242, the subset of files (provided in Step 240) is/are partitioned into multiple (i.e., two or more) shared object subgroups. In one or many embodiment(s) of the invention, with the partitioning of the subset of files, each resulting shared object subgroup may include a mutually-exclusive portion of said subset of files—i.e., any one file in the subset of files may belong to, or may be associated with, only one of the shared object subgroups. Further, each shared object subgroup may encompass files exhibiting one or more file attribute similarities—e.g., all files in a shared object subgroup may be identified as read-only files, all files in a shared object subgroup may have a creation (or a last modified) timestamp that may not exceed a threshold time difference from a creation (or a last modified) timestamp respective to other file(s) in the shared object subgroup, all files may be identified as hidden (or archived) files, etc. Said file(s) grouped through one or more file attribute similarities may also be referred to herein as attribute-similar file(s).

In one or many embodiment(s) of the invention, a cornerstone assumption or observation, pertinent to the grouping of files based on one or more file attribute similarities, may be that said attribute-similar file(s) have a higher likelihood: of remaining immutable (i.e., unchanged) together; of undergoing modifications together; of being deleted together; of reflecting any other nature or behavior together; or of being the subject of any other action together. Further, with the prospect of experiencing, as well as being affected by, any number of events together, any attribute-similar files co-occupying a (shared) object can be paralleled to any single file solely occupying a (dedicated) object.

In one or many embodiment(s) of the invention, without the partitioning or grouping of portions of the subset of files based on file attribute similarities, files having to co-occupy an object, in order to fill an optimal object size of the object, may run into a variety of dilemmas. Most notably, should one or a subset of the co-occupying files require deletion from the backup object storage, the co-occupied object remains, in entirety, in the backup object storage since any remaining co-occupying file(s) therein is/are not deleted together with those that have been. In this respect, one of ordinary skill will appreciate that to remove any object, in entirety, from the backup object storage requires the intent to remove all the constituent data stored there-within as well.

That is, as any dedicated object stores the data, in whole or in part, for a single file, deleting said stored data also confers the deletion of the dedicated object, thereby freeing or deallocating backup object storage space that is no longer being used. On the contrary, as any shared object stores data, in whole or in part, pertaining to more than one file, deleting any data there-from, which falls short of all the data stored there-within (and when the files stored in the shared object are not considered attribute-similar files), would not free up or deallocate backup object storage space associated with the shared object (until all said constituent data is removed). The shared object, unlike the dedicated object, would continue to consume its initial allocation of cloud storage resources despite no longer being occupied by at least a portion (or portions) of the data that had been stored therein during generation of the shared object.

Any shared object including attribute-similar files (as proposed through embodiments disclosed herein), however, behaves like any dedicated object, despite the storage of multiple files (rather than a single file) there-within. In mimicking the behavior of any dedicated object, any shared object, storing attribute-similar files, may carry a high probability that an action, targeting any subset of the attribute-similar files, may also apply to the remaining attribute-similar file(s) due to their exhibited file attribute similarities. Accordingly, the deletion of any subset of the attribute-similar files may imply the deletion of all the attribute-similar files together, thereby also implying the deletion of the shared object. Deletion of the shared object, subsequently, would result in the deallocation of cloud storage resources (which would otherwise be inefficiently utilized had the shared object not stored any attribute-similar files and deletion of a subset of the files in the shared object transpired).

Hereinafter, the remaining steps (i.e., Steps 244, 246, and 248) of the disclosed method are to be performed for each shared object subgroup of the shared object subgroups (obtained in Step 242). Each iteration of the remaining steps, respective to a given shared object subgroup, may be performed serially (e.g., a first iteration is executed, a second iteration is executed upon completion of the first iteration, a third iteration is executed upon completion of the second iteration, and so forth) or in parallel (e.g., multiple iterations are executed and completed concurrently).

In Step 244, the attribute-similar files, of the given shared object subgroup, are assembled into one or more shared object subgroup chunks. In one or many embodiment(s) of the invention, each shared object subgroup chunk may encompass one or more attribute-similar files. Further, the attribute-similar files may be assembled into the shared object subgroup chunk(s) so as to maximize an efficient utilization of the storage space (i.e., a subgroup chunk size (e.g., 4 MB)) allocated to each shared object subgroup chunk.

In Step 246, one or more shared objects is/are generated. In one or many embodiment(s) of the invention, any shared object may refer to a uniquely identifiable unit of, as well as a fixed size container for storing, unstructured (local) data pertaining to at least a portion of the given shared object subgroup (i.e., one or more files). Further, each shared object of the shared object(s) may, respectively, store a shared object subgroup chunk of the shared object subgroup chunk (s) (obtained in Step 244). Each shared object, moreover, may reflect an object size not to exceed an optimal object size (e.g., 4 MB).

In Step 248, the shared object(s) (generated in Step 246) is/are written to a backup object storage within a cloud infrastructure (see e.g., FIG. 1).

Figure 3:
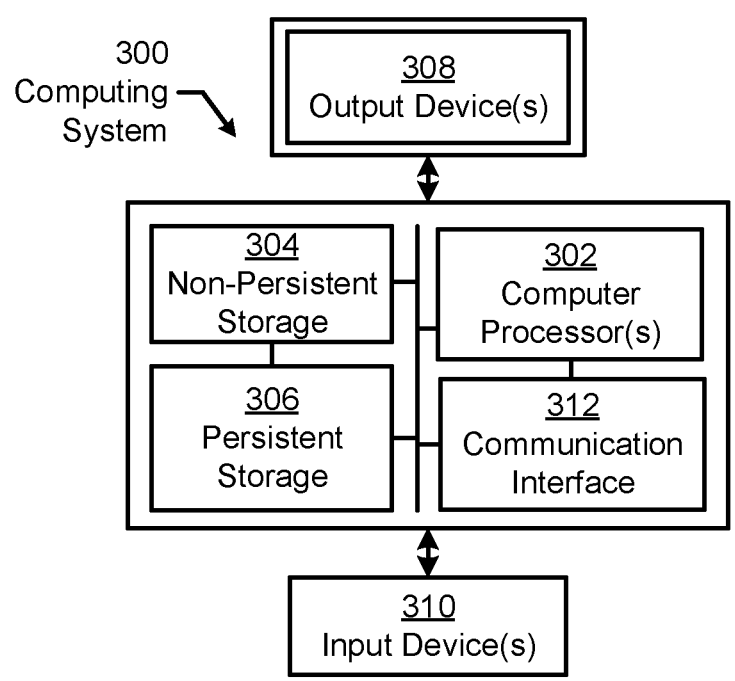
FIG. 3 shows an exemplary computing system in accordance with one or more embodiments of the invention.
Figure 4A:
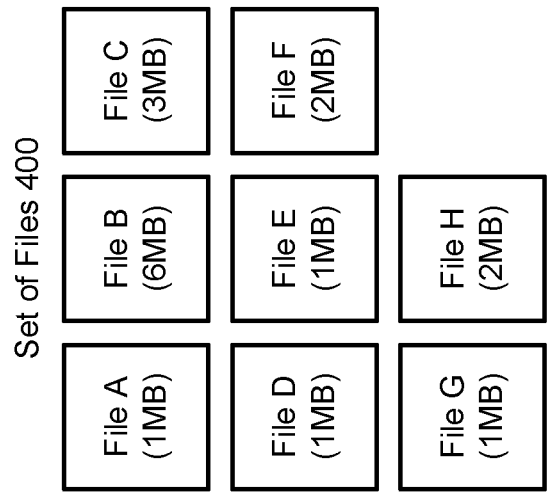
FIGS. 4A-4G show an exemplary scenario in accordance with one or more embodiments of the invention.
Figure 4B:
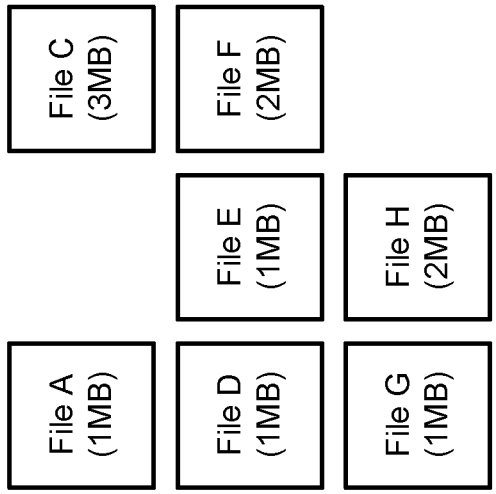
Figure 4B:
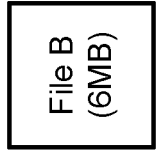
Figure 4C:
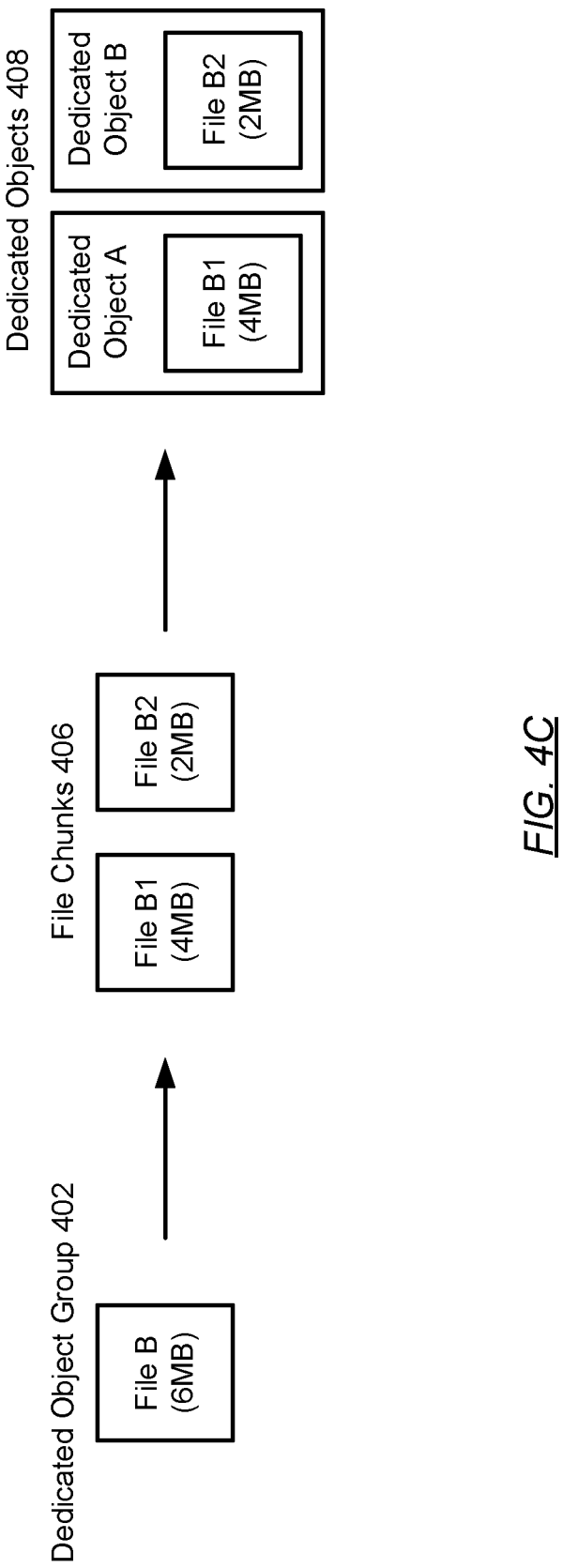
Figure 4D:
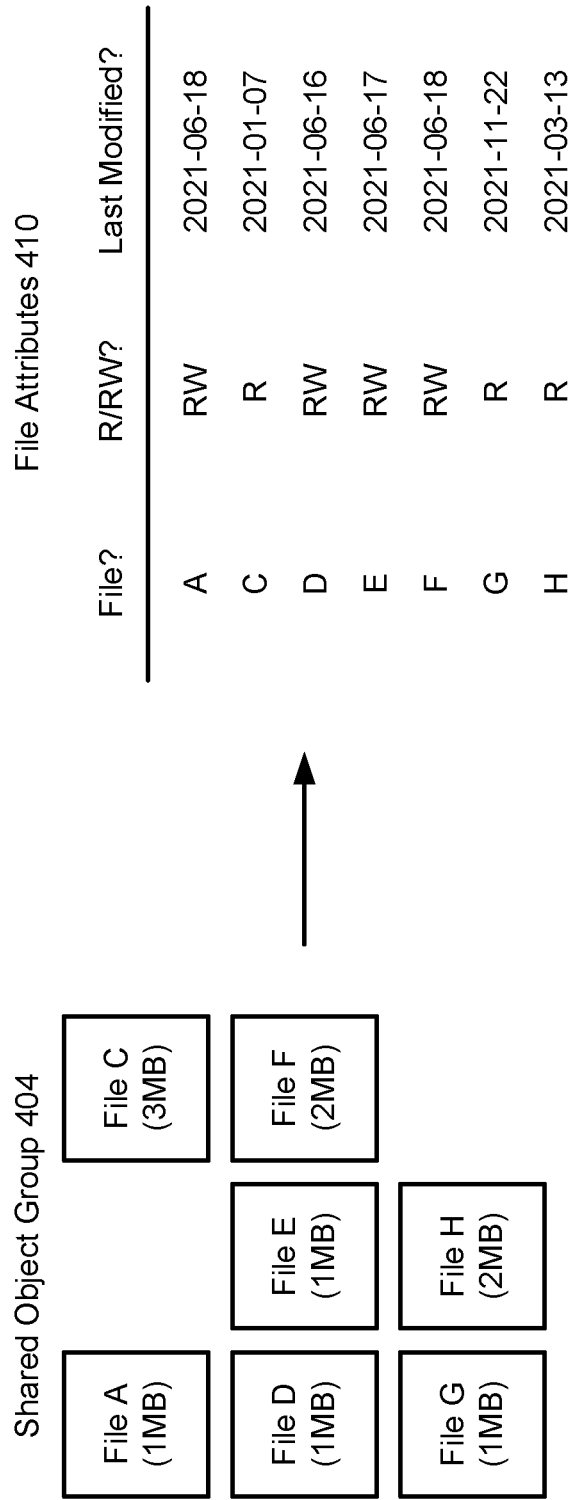
Figure 4E:
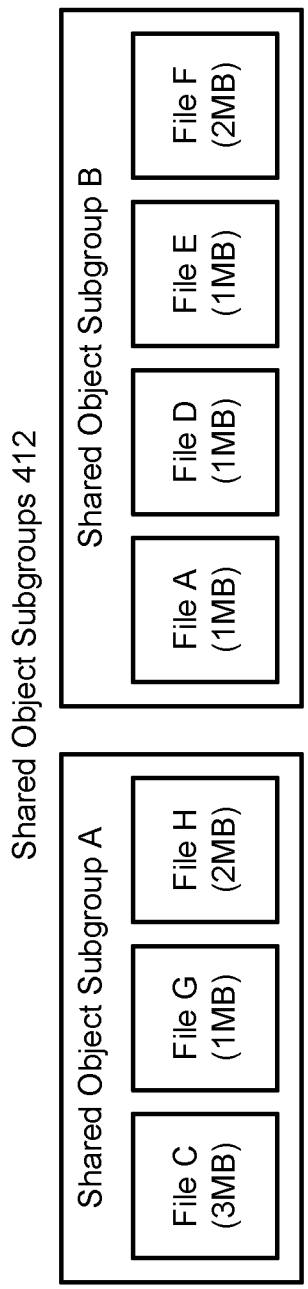
Figure 4F:
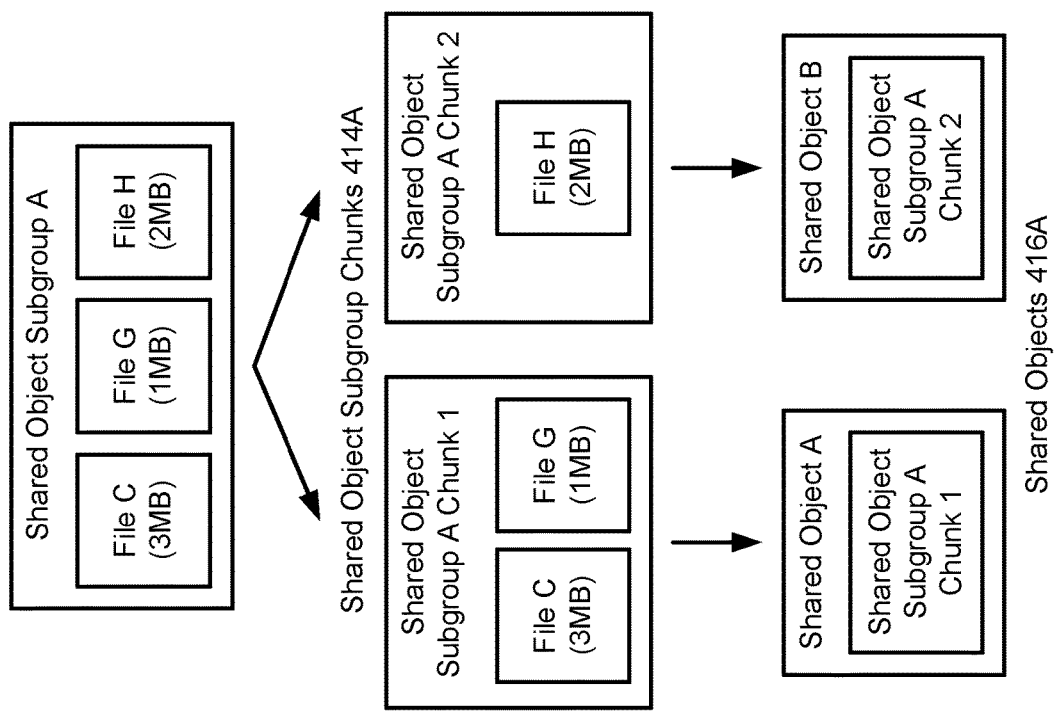
Figure 4G:
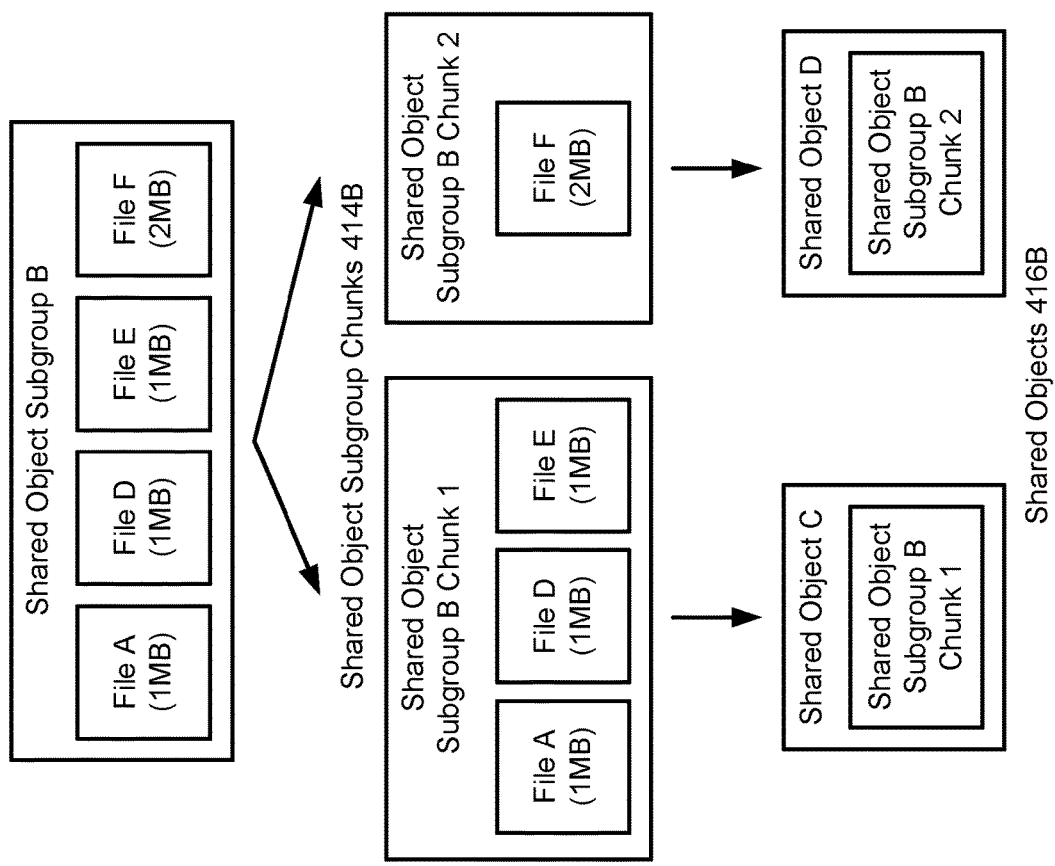

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one or many embodiment(s) of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 4A-4G show an exemplary scenario in accordance with one or more embodiments of the invention. The exemplary scenario, illustrated through FIGS. 4A-4G and described below, is for explanatory purposes only and not intended to limit the scope of the invention.

For context concerning the exemplary scenario, consider files, managed by a host file-system implemented on a host device, are sought to be protected against data loss. To that end, instructions are submitted to a host protection agent executing on the host device, where said instructions direct the host protection agent to perform a host file-system backup operation targeting the aforementioned files. With this setting, also consider each sequential letter (listed in alphabetical order) (e.g., A, B, C, . . . ) that shall describe a corresponding, sequential figure (labeled in alphanumerical order) (e.g., 4A, 4B, 4C, . . . ) as it pertains to the exemplary scenario.

A. In response to the received instructions, a set of files (400), targeted by the host file-system backup operation, is identified; the set of files (400) include 8 files (i.e., File A, File B, File C, File D, File E, File F, File G, and File H); the file size (e.g., file-system metadata) respective to each file is also shown B. Each file in the set of files (400) is subsequently associated with either a dedicated object group (402) or a shared object group (404); the association of each file with one of the object groups is determined based on the file size of the file relative to a predefined threshold file size (4 MB for this exemplary scenario); more specifically, file(s) (i.e., File B) reflecting a file size that at least meets the predefined threshold file size is/are associated with the dedicated object group (402), whereas file(s) (i.e., File A, File C, File D, File E, File F, File G, and File H) reflecting a file size that falls short of the predefined threshold file size is/are associated with the shared object group (404)

C. Concerning the file(s) (i.e., File B) associated with the dedicated object group (402), each of said file(s) is then partitioned into at least one file chunk (406) (i.e., File B1 and File B2), where a chunk size of each file chunk (406) does not exceed a predefined optimal object size (4 MB for this exemplary scenario); thereafter, at least one dedicated object (408) (i.e., Dedicated Object A and Dedicated Object B) is generated, where each dedicated object of the at least one dedicated object (408) stores a file chunk of the at least one file chunk (406), respectively; once generated, the at least one dedicated object (408) is written into a backup object storage (not shown) residing in a cloud infrastructure D. Concerning the file(s) (i.e., File A, File C, File D, File E, File F, File G, and File H) associated with the shared object group (404), file attributes (410) respective to each of said file(s) are obtained; file attribute similarities (i.e., File C, File G, and File H exhibit a read-only attribute, whereas File A, File D, File E, and File F were each last modified within a threshold range of dates) there-between are subsequently identified E. The file(s) (i.e., File A, File C, File D, File E, File F, File G, and File H), associated with the shared object group (404), is/are partitioned into shared object subgroup(s) (412) (i.e., Shared Object Subgroup A (including File C, File G, and File H) and Shared Object Subgroup B (including File A, File D, File E, and File F)) based on the identified file attribute similarities F. Concerning one shared object subgroup (412) (i.e., Shared Object Subgroup A, including File C, File G, and File H), said attribute-similar file(s) of the shared object subgroup (412) is/are assembled into at least one shared object subgroup chunk (414A) (i.e., Shared Object Subgroup A Chunk 1 (including File C and File G) and Shared Object Subgroup A Chunk 2 (including File H)), where a subgroup chunk size of each shared object subgroup chunk (414A) does not exceed the predefined optimal object size (4 MB for this exemplary scenario); thereafter, at least one shared object (416A) (i.e., Shared Object A and Shared Object B) is generated, where each shared object of the at least one shared object (416A) stores a shared object subgroup chunk of the at least one shared object subgroup chunk (414A), respectively; once generated, the at least one shared object (416A) is written into the backup object storage (not shown) residing in the cloud infrastructure G. Concerning another shared object subgroup (412) (i.e., Shared Object Subgroup B, including File A, File D, File E, and File F), said attribute-similar file(s) of the other shared object subgroup (412) is/are assembled into at least one shared object subgroup chunk (414B) (i.e., Shared Object Subgroup B Chunk 1 (including File A, File D, and File E) and Shared Object Subgroup B Chunk 2 (including File F)), where a subgroup chunk size of each shared object subgroup chunk (414B) does not exceed the predefined optimal object size (4 MB for this exemplary scenario); thereafter, at least one shared object (416B) (i.e., Shared Object C and Shared Object D) is generated, where each shared object of the at least one shared object (416B) stores a shared object subgroup chunk of the at least one shared object subgroup chunk (414B), respectively; once generated, the at least one shared object (416B) is written into the backup object storage (not shown) residing in the cloud infrastructure While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing object-based backups, the method comprising:
   obtaining, from a host file-system, file-system metadata descriptive of files;
   associating, based on the file-system metadata, at least a subset of the files with a shared object group; and
   performing an object-based backup of the at least subset of the files using at least one shared object, wherein performing the object-based backup, comprises:
      identifying files of the at least subset of the files exhibiting shared attributes, wherein the shared attributes include at least one of labeled as read-only, a similar creation timestamp, a similar last modified timestamp, labeled as hidden, or labeled as archived;
      partitioning, based on the files of the at least subset of files exhibiting shared attributes, the shared object group into shared object subgroups,
         wherein each resulting shared object subgroup comprises a mutually-exclusive portion of the shared object group,
         wherein a shared object subgroup of the shared object subgroups comprises a portion of files of the at least subset of the files exhibiting one or more of the shared attributes, and
         wherein the partitioning is based on the one or more shared attributes;
      assembling the portion of files into at least one shared object subgroup chunk;
      generating the at least one shared object comprising the at least one shared object subgroup chunk;
      writing the at least one shared object to a backup object storage;
      receiving a request to perform an action on a file of the portion of files in the at least one shared object subgroup chunk, wherein the action comprises making a modification to the file of the portion of files; and
      applying, based on the request, the action to all files in the at least one shared object subgroup chunk, wherein applying the action comprises making the same modification to all the files in the at least one shared object subgroup chunk.

2. The method of claim 1, wherein an object size of each shared object of the at least one shared object does not exceed an optimal object size.

3. The method of claim 2, wherein a file size of each file associated with the shared object group is less than a threshold file size, and wherein the threshold file size matches the optimal object size.

4. The method of claim 1, wherein the at least subset of the files are partitioned into the shared object subgroups based on file attribute similarities there-between.

5. The method of claim 1, the method further comprising:
   associating, based on the file-system metadata, at least a second subset of the files with a dedicated object group; and
   performing a second object-based backup of the at least second subset of the files using at least one dedicated object.

6. The method of claim 5, wherein performing the second object-based backup, comprises:
   for each file in the at least second subset of the files:
      partitioning the file into at least one file chunk;
      generating, respectively, the at least one dedicated object comprising the at least one file chunk; and
      writing the at least one dedicated object to a backup object storage.

7. The method of claim 6, wherein an object size of each dedicated object of the at least one dedicated object does not exceed an optimal object size.

8. The method of claim 7, wherein a file size of each file associated with the dedicated object group at least meets a threshold file size, and wherein the threshold file size matches the optimal object size.

9. A non-transitory computer readable medium (CRM) comprising computer readable program code, which when executed by a computer processor, enables the computer processor to perform a method for optimizing object-based backups, the method comprising:
   obtaining, from a host file-system, file-system metadata descriptive of files;

associating, based on the file-system metadata, at least a subset of the files with a shared object group; and performing an object-based backup of the at least subset of the files using at least one shared object, wherein performing the object-based backup, comprises:

identifying files of the at least subset of the files exhibiting shared attributes, wherein the shared attributes include at least one of labeled as read-only, a similar creation timestamp, a similar last modified timestamp, labeled as hidden, or labeled as archived;

partitioning, based on the files of the at least subset of files exhibiting shared attributes, the shared object group into shared object subgroups, wherein each resulting shared object subgroup includes a mutually-exclusive portion of the shared object group, wherein a shared object subgroup of the shared object subgroups comprises a portion of files of the at least subset of the files exhibiting one or more of the shared attributes, and wherein the partitioning is based on the one or more shared attributes;

assembling the portion of files into at least one shared object subgroup chunk;

generating the at least one shared object comprising the at least one shared object subgroup chunk;

writing the at least one shared object to a backup object storage;

receiving a request to perform an action on a file of the portion of files in the at least one shared object subgroup chunk, wherein the action comprises making a modification to the file of the portion of files; and applying, based on the request, the action to all files in the at least one shared object subgroup chunk, wherein applying the action comprises making the same modification to all the files in the at least one shared object subgroup chunk.

10. The non-transitory CRM of claim 9, wherein an object size of each shared object of the at least one shared object does not exceed an optimal object size.

11. The non-transitory CRM of claim 10, wherein a file size of each file associated with the shared object group is less than a threshold file size, and wherein the threshold file size matches the optimal object size.

12. The non-transitory CRM of claim 9, wherein the at least subset of the files are partitioned into the shared object subgroups based on file attribute similarities there-between.

13. The non-transitory CRM of claim 9, the method further comprising:

associating, based on the file-system metadata, at least a second subset of the files with a dedicated object group; and performing a second object-based backup of the at least second subset of the files using at least one dedicated object.

14. The non-transitory CRM of claim 13, wherein performing the second object-based backup, comprises:

for each file in the at least second subset of the files:
partitioning the file into at least one file chunk;
generating, respectively, the at least one dedicated object comprising the at least one file chunk; and
writing the at least one dedicated object to a backup object storage.

15. The non-transitory CRM of claim 14, wherein an object size of each dedicated object of the at least one dedicated object does not exceed an optimal object size.

16. The non-transitory CRM of claim 15, wherein a file size of each file associated with the dedicated object group at least meets a threshold file size, and wherein the threshold file size matches the optimal object size.

17. A system, the system comprising:

a host device, comprising:

a computer processor;

a host operating system executing on the computer processor and configured to implement a host file-system for managing files; and a host protection agent also executing on the computer processor and having access to the host file-system, wherein the host protection agent is configured to perform a method for optimizing object-based backups, the method comprising:

obtaining, from the host file-system, file-system metadata descriptive of the files;

associating, based on the file-system metadata, at least a subset of the files with a shared object group; and performing an object-based backup of the at least subset of the files using at least one shared object, wherein performing the object-based backup, comprises:

identifying files of the at least subset of the files exhibiting shared attributes, wherein the shared attributes include at least one of labeled as read-only, a similar creation timestamp, a similar last modified timestamp, labeled as hidden, or labeled as archived;

partitioning, based on the files of the at least subset of files exhibiting shared attributes, the shared object group into shared object subgroups, wherein each resulting shared object subgroup includes a mutually-exclusive portion of the shared object group, wherein a shared object subgroup of the shared object subgroups comprises a portion of files of the at least subset of the files exhibiting one or more of the shared attributes, and wherein the partitioning is based on the one or more shared attributes;

assembling the portion of files into at least one shared object subgroup chunk;

generating the at least one shared object comprising the at least one shared object subgroup chunk;

writing the at least one shared object to a backup object storage;

receiving a request to perform an action on a file of the portion of files in the at least one shared object subgroup chunk, wherein the action comprises making a modification to the file of the portion of files; and applying, based on the request, the action to all files in the at least one shared object subgroup chunk, wherein applying the action comprises making the same modification to all the files in the at least one shared object subgroup chunk.

18. The system of claim 17, the system further comprising:

cloud infrastructure operatively connected to the host device and comprising a backup object storage, wherein performing the object-based backup results in the at least one shared object being written to the backup object storage.

* * * * *